Patented Oct. 17, 1939

2,176,853

UNITED STATES PATENT OFFICE 2,176,853

AZO DYESTUFFS SOLUBLE IN WATER

Erich Fischer, Bad Soden in Taunus, and Richard Huss, Frankfort-on-the-Main-Hochst, Germany, assignors to General Aniline Works, Inc., New York, N. Y., a corporation of Delaware No Drawing. Application October 14, 1936, Serial No. 105,622. In Germany October 15, 1935

5 Claims. (Cl. 260—198)

The present invention relates to azo dyestuffs soluble in water and more particularly it relates to dyestuffs of the following general formula:

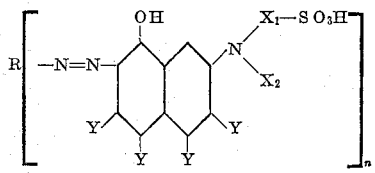

wherein $n$ means the number 1 or 2, R stands for a radical of the benzene, naphthalene or diphenyl series, $X_1$ stands for alkyl or hydroxyalkyl and $X_2$ for hydrogen, an alkyl or sulfoalkyl radical, and wherein the naphthalene nucleus contains at least one sulfonic acid or carboxylic acid group in the positions indicated by Y.

Most of the azo dyestuffs, which are used for dyeing leather, especially chrome leather, merely dye the surface of the leather. There is a technical demand for dyestuffs which have the property of penetrating deeply into the leather, but their number is still very small.

We have found that valuable azo dyestuffs soluble in water and especially suitable for dyeing leather on account of their property of penetrating deeply into the leather are obtainable by combining in an alkaline medium any diazo- or diazo-azo-compound with a coupling component of the general constitution:

wherein $X_1$ stands for alkyl or hydroxyalkyl and $X_2$ for hydrogen, an alkyl or sulfoalkyl radical, and wherein the naphthalene nucleus contains at least one sulfonic acid or carboxylic acid group in the positions indicated by Y.

Inasmuch as the dyestuffs are capable of forming metal complex compounds, they may also be transformed into their complex compounds, having the same good properties, by treatment with agents yielding metal according to known methods.

The new dyestuffs are distinguished over the known azo dyestuffs, obtainable by coupling diazotized aromatic amines with N-alkylaminonaphthalene-omega-sulfonic acids or 2-alkylamino-8-hydroxynaphthalene - 6 - sulfonic acids, in part by their better solubility in water, in part by their better fastness to alkalies or acids and in part by their property of penetrating more deeply into the leather.

The following examples serve to illustrate the invention, but they are not intended to limit it thereto; the parts are by weight, unless otherwise stated:

(1) 17.3 parts of sulfanilic acid (molecular weight 173) are stirred with 200 parts by volume of water and 15 parts by volume of crude hydrochloric acid of 20° Bé., cooled with ice to 10° C. and diazotized with 6.9 parts of sodium nitrite in the usual manner. The suspension of the diazo-compound thus obtained is then caused to run slowly at 0° C. into an aqueous solution of 41 parts of the disodium salt of 2-(sulfoethylamino)-8-naphthol-6-sulfonic acid (molecular weight 391) and 25 parts of calcined sodium carbonate. When the coupling is complete the dyestuff formed is isolated and dried. It is a black-brown powder, which dissolves in water to a red-brown solution; the dyestuff is suitable, for instance, for dyeing chrome-tanned calf.

The dyestuff has the following formula:

Chrome-tanned calf is de-acidified (sweetened) with 1.5 per cent. of borax, well rinsed and dyed with 3 per cent. of the above dyestuff for 1 hour at 60° C. After addition of formic acid, the whole is greased in a fresh bath and finished as usual. The cross-section of the leather has a brown color, except for a narrow middle zone and may very well be buffed without changing its tint.

(2) 30.3 parts of 2-naphthylamine-6.8-disulfonic acid (molecular weight 303) are stirred with 200 parts by volume of water and 15 parts by volume of crude hydrochloric acid of 20° Bé., cooled with ice to 3° C. and diazotized with a solution of 6.9 parts of sodium nitrite in 50 parts by volume of water. The diazo-solution is then caused to run slowly at 0° C. into an aqueous solution of 41 parts of the disodium salt of 2-(sulfoethyl-amino)-8-naphthol-6-sulfonic acid and 30 parts of calcined sodium carbonate. After complete coupling, the dyestuff is salted out, filtered and dried. It is especially suitable for dyeing leather.

Chrome-tanned goatskin is de-acidified as usual and dyed with 2 per cent. of the above dyestuff. The dyestuff penetrates deeply into the leather which shows a yellowish-brown coloration on the surface as well as in the section. The finished leather resists breakage in the lasting operation.

(3) 24.9 parts of sodium 2-amino-5.6.7.8-tetrahydronaphthalene-3-sulfonate (molecular weight 249) are dissolved in 200 parts by volume of hot water. This solution is slowly poured into a mixture of ice and 25 parts by volume of crude hydrochloric acid of 20° Bé. The finely divided free sulfonic acid thus obtained is diazotized as usual at 0° C.–5° C. with a solution of 6.9 parts of sodium nitrite in 50 parts by volume of water. The diazo-solution is then gradually introduced into an aqueous solution of 41 parts of the disodium salt of 2-(sulfoethylamino)-8-naphthol-6-sulfonic acid (molecular weight 391), cooled to 0° C., to which there has been added a sodium carbonate solution in excess. The dyestuff, which is very quickly formed, is salted out with sodium chloride, isolated and dried. It is a brown-black powder, which dissolves in water to a red-brown solution; the dyestuff is very suitable for dyeing leather.

Chrome-tanned velvet leather is well drummed before dyeing. It is dyed in a fresh bath with 8 per cent. of this dyestuff, calculated upon the dry weight of the leather. After a two hours' dyeing 4 per cent. of formic acid is gradually added to the dye-bath and drumming is continued for another hour. Thereupon, the leather is thoroughly rinsed and dried. The leather dries with a red-brown color and may very well be buffed, without materially changing its tint.

(4) 21.7 parts of 5-sulfo-2-aminobenzoic acid are dissolved in 150 parts by volume of water with 8 parts of calcined sodium carbonate, mixed with ice and 20 parts by volume of crude hydrochloric acid of 20° Bé. and diazotized as usual at 0° C. with 6.9 parts of sodium nitrite. The solution of the diazo-compound thus obtained is then slowly run at 0° C. into an aqueous solution of 41 parts of the sodium salt of 2-(sulfoethylamino)-8-naphthol-6-sulfonic acid and 30 parts of calcined sodium carbonate. After complete coupling, the dyestuff is isolated and dried as usual. It is a brown-black powder, which dissolves in water to a red-brown solution. The dyestuff dyes leather reddish dark-brown tints, for instance, as follows:

East Indian kips are dyed after drumming with 100 grams of the dyestuff for 1 dozen kips. After a 50 minutes' drumming, 50 grams of sulfuric acid are added to the bath. The dyestuff penetrates deeply into the leather which is finished as usual. After drying, the leather may be well buffed and used for velvet effects.

(5) 29.9 parts of sodium para-aminoazobenzene-monosulfonate (molecular weight 299) are dissolvd in 400 parts by volume of water at 65° C., cooled, while stirring, to 10° C. and precipitated with a saturated sodium chloride solution until a test sample bleeds into filter paper to a small extent only. The whole is then mixed with 6.9 parts of sodium nitrite, stirred for 10 minutes, and 30 parts by volume of crude hydrochloric acid of 20° Bé. are quickly added. After complete diazotization, the whole is slowly introduced at 0° C. into a solution, rendered alkaline with sodium carbonate, of 41 parts of the disodium salt of the 2-(sulfoethylamino)-8-naphthol-6-sulfonic acid. The final reaction must be alkaline with sodium carbonate. The dyestuff formed is isolated and dried as usual. It is especially adapted for dyeing leather.

100 kilos (shaver's weight) of chrome-tanned sheep leather are dyed in the same bath with 2 kilos of the above dyestuff and 1 kilo of an acid or substantive dark-brown dyestuff which does not penetrate into the leather. In this manner, a deep-brown leather with a uniformly dyed section is obtained.

(6) 10.7 parts of para-toluidine are diazotized as usual at 0° C.–5° C. in 200 parts of water with 6.9 parts of sodium nitrite in the presence of 25 parts by volume of hydrochloric acid of 20° Bé. The diazo-solution is then caused to run into an aqueous solution, cooled to 0° C., of 41 parts of the disodium salt of 2-(sulfoethyl-amino)-8-naphthol-6-sulfonic acid and 25 parts of calcined sodium carbonate. The dyestuff formed is salted out, isolated and dried. It is a brown-black powder, which is soluble in water to a red-brown solution.

Chrome-tanned neat's leather is de-acidified with 2% of sodium bicarbonate and dyed with 3% of the above dyestuff. After the dye-bath has been well exhausted with acid, the leather is cross-dyed in the same or in a fresh bath with 0.5 per cent. of a red-brown basic dyestuff. There are obtained covered dyeings with a completely through-dyed section of the leather.

By using in the preceding example ortho-anisidine instead of para-toluidine as diazo-component, a brown dyestuff is obtained which dissolves in water to a red-brown solution and through-dyes leather red-brown tints.

(7) 12.75 parts of para-chloraniline (molecular weight 127.5) are diazotized as usual at 0° C.–5° C. with 6.9 parts of sodium nitrite in 200 parts by volume of water in the presence of 25 parts by volume of hydrochloric acid of 20° Bé. The diazo-solution is then caused to run into an aqueous solution, cooled to 0° C., of 42 parts of the disodium salt of 2-(sulfoethyl-methyl-amino)-8-naphthol-6-sulfonic acid (molecular weight 405) and 25 parts of calcined sodium carbonate. After complete coupling, the dyestuff formed is salted out, isolated and dried. It is a dark brown powder.

According to the method of dyeing indicated in Example 6 a yellowish-brown leather with a completely through-dyed section is obtained with this dyestuff.

(8) 10.7 parts of ortho-toluidine (molecular weight 107) are diazotized at 0° C. with 6.9 parts of sodium nitrite in 200 parts by volume of water, in the presence of 25 parts by volume of hydrochloric acid of 20° Bé. The diazo-solution is run into an aqueous solution, cooled to 0° C., of 39 parts of the disodium salt of 2-(sulfo-methylamino)-8-naphthol-6-sulfonic acid (molecular weight 377) and 25 parts of calcined sodium carbonate. After complete coupling the dyestuff is salted out, isolated and dried. It is a dark brown powder which is readily soluble in water.

According to the dyeing process indicated in Example 6 red-brown tints are obtained on chrome-tanned calf with a through-dyed section of the leather.

(9) 17.3 parts of sulfanilic acid (molecular weight 173) are mixed with 200 parts by volume of water and 15 parts by volume of hydrochloric acid of 20° Bé., cooled with ice to 10° C. and diazotized as usual with 6.9 parts of sodium nitrite. The suspension of the diazo-compound is caused to run into an aqueous solution of 44 parts of the disodium salt of 2-(sulfo-hydroxypropylamino)-8-naphthol-6-sulfonic acid (molecular weight 421) and 25 parts of calcined sodium carbonate. After complete coupling, the dyestuff is salted out, isolated and dried. It is a black-brown powder, which dissolves in water to a reddish-brown solution and is, for instance, suitable for dyeing chrome-tanned calf.

According to the dyeing process indicated in Example 1 a red-brown leather is obtained, which may well be buffed, without changing its tint.

(10) 15.75 parts of 4-chloro-2-amino-1-methoxybenzene (molecular weight 157.5) are diazotized as usual at 0° C. with 6.9 parts of sodium nitrite in the presence of 25 parts by volume of hydrochloric acid of 20° Bé. The solution of the diazo-compound obtained is then caused to run at 0° C. into an aqueous suspension of 54 parts of the sodium salt of 2-(di-sulfoethyl-amino)-8-naphthol-6-sulfonic acid (molecular weight 521) to which there have been added 25 parts of calcined sodium carbonate. After complete coupling, the dyestuff is salted out, isolated and dried. It is a black-brown powder, which dissolves in water to a red-brown solution. The dyestuff yields, according to the dyeing process indicated in Example 6, for instance, on chrome-tanned neat's leather red-brown dyeings which are penetrated deeply into the leather; it may, therefore, well be buffed.

(11) 18.4 parts of benzidine (molecular weight 184) are tetrazotized as usual at 0° C. with 13.8 parts of sodium nitrite in the presence of 50 parts by volume of hydrochloric acid of 20° Bé. The solution of the tetrazo-compound obtained is run slowly, while stirring, at 5° C.–10° C. into an aqueous solution of 14.6 parts of salicylic acid (molecular weight 138) to which sodium carbonate in excess has been added. After complete formation of the monoazo dyestuff, an aqueous suspension of 54 parts of the sodium salt of 2-(di-sulfoethyl-amino)-8-naphthol-6-sulfonic acid (molecular weight 521) is added. In a medium rendered alkaline by means of sodium carbonate the formation of the diazo-dyestuff takes place very quickly. The finished dyestuff is salted out at 50° C., isolated and dried. It is a black-brown powder and is especially suitable for dyeing leather.

The dyestuff yields, according to the dyeing process indicated in Example 3, a deep dark brown leather, which may well be buffed.

(12) 6 parts of the azo dyestuff obtainable by coupling diazotized 6-nitro-2-amio-1-hydroxy-benzene-4-sulfonic acid with 2-(sulfomethyl-amino)-8-naphthol-6-sulfonic acid in an alkaline medium, are boiled for 24 hours under reflux with 150 parts by volume of water, 7.5 parts of chromic fluoride (with a content of chromium corresponding with 36.8% of $Cr_2O_3$) in the presence of sodium acetate. Thereupon, the dyestuff is precipitated, after cooling, with sodium chloride and filtered. The sodium salt of the dyestuff is a black powder, which is especially suitable for dyeing leather.

According to the dyeing process indicated in Example 2 reddish grey tints are obtained on chrome-tanned goatskin. The finished leather may well be buffed, without materially changing its tint.

The coupling components used in the preceding examples for the preparation of the dyestuffs may, for instance, be replaced by the following:
2-(sulfoethylamino)-8-naphthol-3.6-disulfonic acid,

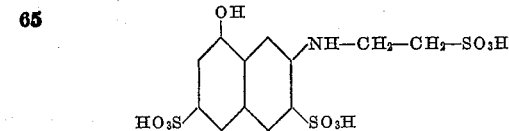

According to the selection of the diazo-component, dyestuffs are obtained which have properties similar to those mentioned above.

We claim:
1. The azo dyestuffs soluble in water corresponding with the following general formula:

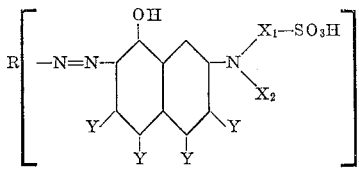

wherein R stands for a member of the group consisting of radicals of the benzene and naphthalene series and diphenyl, $n$ means the number 1 when R is a radical of the benzene or naphthalene series and 2 when R is diphenyl, $X_1$ stands for a member of the group consisting of alkyl and hydroxyalkyl and $X_2$ for a member of the group consisting of hydrogen, alkyl and sulfoalkyl, and wherein the naphthalene nucleus contains at least one sulfonic acid group in the positions indicated by Y, which compounds penetrate deeply into the leather and yield dyeings of various shades.

2. The azo dyestuffs soluble in water corresponding with the following general formula:

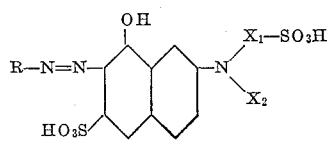

wherein R stands for a member of the group consisting of radicals of the benzene and naphthalene series, $X_1$ stands for a member of the group consisting of alkyl and hydroxyalkyl and $X_2$ for a member of the group consisting of hydrogen, alkyl and sulfoalkyl, which compounds penetrate deeply into the leather and yield dyeings of various shades.

3. The compound of the following formula:

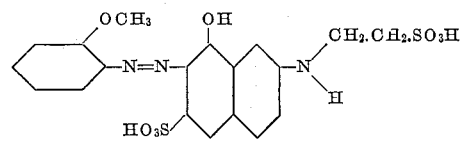

being a brown powder which dissolves in water to a red-brown solution and through-dyes leather red-brown tints.

4. The compound of the following formula:

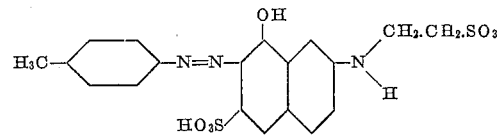

being a brown-black powder which dissolves in water to a red-brown solution and through-dyes leather red-brown tints.

5. The compound of the following formula:

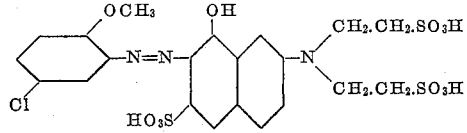

being a brown-black powder which dissolves in water to a red-brown solution and through-dyes leather red-brown tints.

ERICH FISCHER.
RICHARD HUSS.